United States Patent [19]

Grieb et al.

[11] Patent Number: 5,012,638
[45] Date of Patent: May 7, 1991

[54] FUEL FEED METHOD AND APPARATUS FOR A TURBORAMJET ENGINE

[75] Inventors: Hubert Grieb, Germering; Burkhard Simon, Röhrmoos; Martin Albers, Munich, all of Fed. Rep. of Germany

[73] Assignee: MTU Motoren- Und Turbinen-Union Munchen GmbH, Fed. Rep. of Germany

[21] Appl. No.: 401,237

[22] Filed: Aug. 31, 1989

[30] Foreign Application Priority Data

Sep. 1, 1988 [DE] Fed. Rep. of Germany ....... 3829775
Oct. 29, 1988 [DE] Fed. Rep. of Germany ....... 3836912

[51] Int. Cl.$^5$ ................................................ F02K 7/16
[52] U.S. Cl. ...................... 60/224; 60/270.1; 60/39.463
[58] Field of Search ............... 60/244, 245, 270.1, 60/267, 261, 224, 225, 39.463, 39.465, 204

[56] References Cited

U.S. PATENT DOCUMENTS 3,000,176  9/1961  Kuhrt ..................... 60/244
3,910,037  10/1975  Salkeld ................... 60/259
4,909,031  3/1990  Grieb ..................... 60/244

Primary Examiner—Louis J. Casaregola
Assistant Examiner—Laleh Jalali
Attorney, Agent, or Firm—Evenson, Wands, Edwards, Lenahan & McKeown

[57] ABSTRACT

A fuel feed method and apparatus for a turboramjet engine having a combustion chamber operable as a turbine engine afterburner and as ramjet engine combustion chamber is disclosed which features the concurrent injection of kerosene and hydrogen. At low Mach numbers, kerosene is the predominant fuel injected, while at growing speeds, hydrogen is injected in increasing proportions. This provides for a short combustion chamber length while minimizing the on-board fuel load and benefits especially small-size hypersonic aircraft.

3 Claims, 1 Drawing Sheet

FUEL FEED METHOD AND APPARATUS FOR A TURBORAMJET ENGINE

BACKGROUND AND SUMMARY OF THE INVENTION

This invention relates to a fuel feed method for a turboramjet engine for a hypersonic aircraft, having a combined combustion chamber operable as a turbine engine afterburner and a ramjet engine combustion chamber, where before injection, liquid hydrogen is used for cooling a combustion chamber wall. The invention also relates to apparatus for accommodating the fuel feed method in a turboramjet engine which operates in a tubine mode at a lower Mach number range and in a ramjet made in an upper Mach number range.

Current development efforts involve hypersonic aircraft capable of takeoff and landing on normal airfields and developing cruise speeds of several Mach. Hypersonic aircraft of this description can find use either as fast long-haul transports or normal takeoff capability space shuttles. Attainable Mach numbers range from 4 to 8 at altitudes around 30 km.

As a fuel for engines to power these hypersonic aircraft, hydrogen is considered the most favorable, because it affords a number of advantages over other known fuels. The on-board fuel mass needed to meet the energy requirement of a certain mission is lower than for other fuels, and this benefits the takeoff weight. The cooling capacity of liquid hydrogen, for the same amount of energy, by far exceeds that of, i.e., kerosene, which considerably benefits the engine and aircraft cooling effort. The use of hydrogen, when compared with other fuels, finally makes for a substantially shorter afterburner/ ramjet combustion chamber, and so for shorter engines, this resulting in-correspondingly lower weight plus reduced surface areas in need of cooling. Also, the faster chemical rate of hydrogen makes for greater stability of the combustion process in the combustion chamber.

The disadvantages associated with the use of hydrogen are that at a given mission energy requirement, liquid hydrogen needs much more storage space than other liquid fuels, which is aggravated again by weight and space penalties incurred by the hydrogen tanks with their insulation and possible cooling requirements. The larger the aircraft, however, the more said disadvantages are cancelled by the benefits until a point is reached where liquid hydrogen based combustion become the most desirable.

These disadvantages nevertheless make the propulsion system of the above description problematic when the takeoff weight is relatively low, or the hypersonic aircraft small A disadvantage is provided also by the fact that at low airspeeds the cooling capacity of the liquid hydrogen cannot be exploited effectively, whereas on the other hand the hydrogen is to be vaporized and heated Prior to combustion.

A broad object of the present invention is to provide fuel feed method to effectively propel also small-size hypersonic aircraft and achieve highly stable combustion at a minimum of on-board fuel. It is also an object to minimize the combustion chamber dimensions, especially the length.

These and other objects are achieved according to preferred embodiments of the invention by providing a fuel feed method wherein kerosene and hydrogen are simultaneously injected into the combustion chamber such that combustion in the combustion chamber is sustained essentially by means of keorsene in a lower Mach number range wherein over the entire Mach number range, hydrogen is added at least sufficiently to adequately cool the combustion chamber wall on the one hand and to achieve an adequately high combustion chamber temperature to support economical combustion of kerosene on the other, and wherein at growing Mach number the kerosene/hydrogen feed ratio is increasingly growing richer in hydrogen The method of the present invention involves the concurrent supply of kerosene and hydrogen to sustain combustion chamber operation. The combustion chamber on the one hand operates as an afterburner in the turbojet mode of the engine, and on the other it operates as a ramjet combustion chamber in the ramjet mode. In this manner the kerosene/hydrogen ratio can be made an optimum to suit the Mach number. At low Mach numbers under 4 the inlet temperatures of the combustion chamber run in the 500° to 900°-K range, so that the requirement for hydrogen-based cooling of the combustion chamber wall is still moderate In this Mach number range, the fuel injected is mostly kerosene, and this keeps the mass of on-board liquid hydrogen low. Accordingly the normally elaborate provisions made to store the liquid hydrogen can be reduced, especially on small aircraft Another advantage afforded is that combustion chamber wall cooling is adequate at any operating point while no resort must be made to additional high-energy cooling efforts. Also, the hydrogen supplied raises the combustion temperature to a point where the burning of kerosene becomes economical.

In the Mach number range under 4, i.e., in the post-takeoff phase and during climb, the combustion of kerosene is thus improved and the mass of necessary on-board hydrogen is minimized. Also, the cooling capacity of the liquid hydrogen used is fully utilized as a heat sink at any operating point.

An important advantage provided by the present invention is that the turboramjet using it operates with the combustion chamber active throughout the entire flight range from takeoff to the upper limit Mach number. In the turbine mode the combustion chamber operates as an afterburner, while after changeover to the ramjet mode, it operates as a ram combustion chamber.

In a further advantageous aspect of the present invention, hydrogen is the only fuel used for combustion once a certain upper limit airspeed is reached. Depending on the engine design this speed is around several Mach. At higher Mach numbers the amount of liquid hydrogen needed to cool the combustion chamber wall is equal to the amount of gaseous preheated hydrogen needed to operate the ramjet engine. This makes for optimum utilization of the thermal capacity of the liquid hydrogen.

The upper limit Mach number, at which hydrogen begins to be the only fuel injected, is selected such that the inlet temperature of the air entering the combustion chamber is still below the spontaneous ignition temperature of kerosene. At higher Mach numbers, with their higher inlet temperatures, this prevents the kerosene from igniting prematurely and so damaging the engine.

The cooling of the combustion chamber wall is achieved by utilizing the thermal capacity of the liquid hydrogen, a Practice known from rocket nozzle work. The hydrogen routed to the rear injection ports is vaporized by the heat absorbed in the cross-counterflow at the combustion chamber wall and is heated to a favorable temperature level. The cooling of the combustion chamber wall may here be strictly by convection in a fashion similar to that used for cooling the nozzles of rocket engines.

Further significant advantages afforded by the present invention are that hydrogen combustion raises the temperature of the air in the combustion chamber to substantially accelerate kerosene combustion. Despite the use of kerosene, therefore, the length of the combustion chamber can be held about as short as that of a combustion chamber using hydrogen only. It simultaneously improves the stability of kerosene combustion and so alleviates the risk of combustor vibrations (buzz, whine) associated with the burning of straight kerosene.

The front kerosene injection ports are preferably integrated into the trailing edges of streamlined radial struts. These struts serve to support the core engine, and they are therefore needed for design reasons. Since they require cooling, anyway, the injection lines are included into the strut cooling system. When kerosene injection is halted at higher Mach numbers, the lines leading to the injection ports need draining to prevent residual kerosene from cracking.

In a further advantageous aspect of the present invention the rear hydrogen injection ports are provided in V-section flameholders. Flameholders of this geometry generate reverse-flow regions causing the fuel to be thoroughly swirled and burned effectively.

In this arrangement the injection ports may be located either in the trailing edges of the flameholders and/or upstream of the trailing edges. In the latter position of the Ports the hydrogen provides film cooling for the flameholders. The position also makes for a more uniform distribution of the hydrogen.

In a still further aspect of the present invention the flameholders are radially oriented and equally spaced around the circumference of the combustion chamber. This provides a simple design solution for the hydrogen feed arrangement. In an alternative arrangement the flameholders extend circumferentially to form a continuous band of flameholders These generally known variants uniformly distribute the fuel, especially the kerosene in the combustion chamber, to keep the mixing length short.

Other objects, advantages and novel features of the present invention will become apparent from the following detailed description of the invention when considered in conjunction with the accompanying drawings.

DETAILED DESCRIPTION OF THE DRAWINGS

Figure 1:
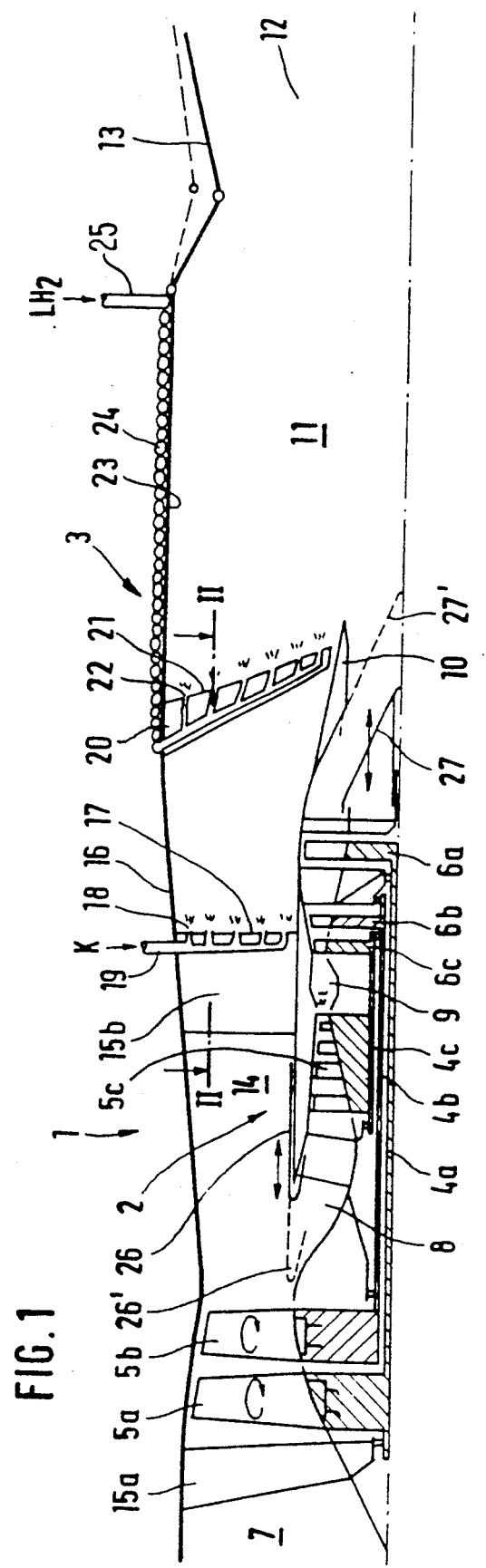
FIG. 1 is a partial schematic elevation view illustrating a turboramjet engine constructed in accordance with a preferred embodiment of the invention.

FIG. 1 is a selective schematic elevation view and illustrates a turboramjet engine 1 essentially comprising a gas turbine engine 2 and a ramjet engine 3. The gas turbine engine 2 has three concentrically arranged shafts 4a, 4b and 4c connecting to respective compressor blades 5a, 5b and, 5c at the one end, and to turbine states 6a, 6b and 6c at the other. In this arrangement the compressor blades 5a and 5b are rotatably adjustable about a radial axis such that in the ramjet mode of operation they allow the inlet airflow to pass practically freely and without performing work. This practically prevents the low-pressure shaft 4a and the intermediate pressure shaft 4b from rotating in the ramjet mode. Reference is made to commonly assigned German Patent Applications P 37 17 968.3 and 37 38 703 and their counterpart U.S. Ser. No. 199,901, filed May 27, 1988, for various details of such a combustion turboramjet engine.

The gas turbine engine 2 is an essentially bypass-type design, where a portion of the air flowing into the intake duct 7 is routed into the core engine intake 8 and onward, through the high-pressure compressor 5c, into a gas turbine combustion chamber 9. The hot combustion gases, having passed through the three turbine stages 6a, 6b and 6c and the cone 10, then reach the combustion chamber 11, which is now selected to act as an afterburner. Along its gas exhaust port 12 the combustion chamber 11 has a variable nozzle 13.

Another portion of the air flowing into the intake duct 7 reaches the bypass duct 14 and is admixed in the combustion chamber 11 at a point downstream of the cone 10 with the hot gas stream arriving through the cone 10.

The gas turbine engine 2 is suspended in the engine casing 16 by means of a front row and a rear row of circumferentially spaced struts 15a and 15b. Along their trailing edges 17 the rear struts 15b exhibit a row of injection ports 18 through which the kerosene fed through a pipe line 19 is injected into the bypass duct 14.

Provided downstream of the rear struts 15b is a number of circumferentially spaced flameholders 20 arranged axially in-line with the struts 15b. Along their trailing edges 21 the flameholders 20 have rear injection ports 22 for injecting gaseous hydrogen ($GH_2$) into the combustion chamber 11.

The combustion chamber wall 23 is externally surrounded by helically arranged cooling ducts 24, where liquid hydrogen is fed through the inlet line 25 and the cooling ducts 24 to the injection ports 22 in the flameholders 20. The liquid hydrogen picks up heat when passing through the cooling ducts 24 while cooling the combustion chamber wall 23 to a degree that it turns gaseous by the time it reaches the rear injection ports 22 and comes preheated to a favorable temperature At a predetermined upper limit Mach number the turboramjet engine 1 is switched over to ramjet operation, i.e., the gas turbine engine 2 is shut down. For this purpose, a sleeve valve 26, which in the turbine engine mode of operation is in the solid-line position shown, is moved into the broken-line position 26', causing the entire airstream entering intake duct 7 to be ducted through the byPass duct 14 and towards the combustion chamber 11. At its exit end the gas turbine engine 2 is sealed by an axially slideably arranged nozzle cone 27, which in the ramjet mode is in the broken-line position 27'. Simultaneously the compressor blades 5a and 5b (fan blades) are feathered, i.e., they are rotated about their respective radial axis into a position where they offer the least resistance to the incoming airstream. See the above-mentioned commonly assigned applications for details of systems that could be used to carry out this transformation for ramjet mode operations.

Figure 2:
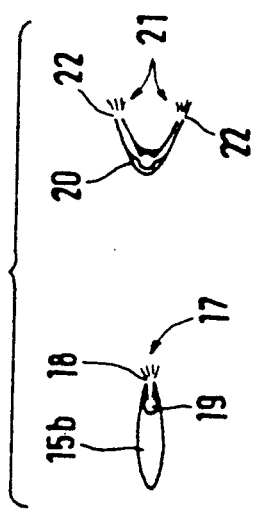
FIG. 2 is a partial schematic longitudinal sectional view taken along line II—II of FIG. 1.

FIG. 2 is a cross-sectional view taken along line II—II of FIG. 1 and illustrates a rear strut 15b and a flameholder 20. The strut 15b exhibits a streamlined shape contour, while the flameholder 20 is V-shaped in section Along either trailing edge 2 of each flameholder 20, rear $H_2$ injection ports 22 are arranged. Also, the flameholder 20 and the strut 15b are arranged in-line axially Kerosene is injected through the ports 18 in the trailing edge 17 of the strut 15b.

The inventive concept is not restricted to the embodiment illustrated. The arrangement and method is equally applicable to straight-flow turbojet engines having a bypass duct and bypass valve for ramjet operation or to similar configurations.

Although the invention has been described and illustrated in detail, it is to be clearly understood that the same is by way of illustration and example, and is not to be taken by way of limitation. The spirit and scope of the present invention are to be limited only by the terms of the appended claims

What is claimed is:

1. Fuel feed method for a turboramjet engine for a hypersonic aircraft, having a combined combustion chamber operable as a turbine engine afterburner and a ramjet engine combustion chamber, where before being injected, liquid hydrogen is used for cooling a combustion chamber wall, wherein kerosene and hydrogen are simultaneously injected into the combustion chamber such that combustion in the combustion chamber is sustained essentially by means of kerosene in a lower Mach number range, wherein over the entire Mach number range, hydrogen is added at least sufficiently to adequately cool the combustion chamber wall on the one hand and to achieve an adequately high combustion chamber temperature to support economical combustion of kerosene on the other, and wherein at growing Mach number, the kerosene/hydrogen feed ratio is increasingly growing richer in hydrogen.

2. A fuel feed method as claimed in claim 1, wherein from a certain upper limit Mach number, hydrogen becomes the only fuel to sustain combustion.

3. A fuel feed method as claimed in claim 2, wherein the upper limit Mach number is selected such that the inlet temperature of the air entering the combustion chamber is just below the spontaneous ignition temperature of kerosene.

* * * * *